United States Patent [19]

Granestrand

[11] Patent Number: 5,303,315
[45] Date of Patent: Apr. 12, 1994

[54] NEAR Z DIGITAL SWITCH

[75] Inventor: Per O. Granestrand, Tyreso, Sweden

[73] Assignee: Telefonaktiebolaget L M Ericsson, Stockholm, Sweden

[21] Appl. No.: 937,969

[22] Filed: Sep. 1, 1992

[51] Int. Cl.$^5$ .............................................. G02B 6/10
[52] U.S. Cl. ............................................... 385/16
[58] Field of Search .................................. 385/16, 17

[56] References Cited

U.S. PATENT DOCUMENTS 4,756,588 7/1988 Granestrand ........................ 385/16
4,917,449 4/1990 Granestrand .................... 350/96.14

OTHER PUBLICATIONS

"Design of Integrated Optical Switches for Use in Fiber Data Transmission Systems" by Steinberg et al., IEEE Journ. Quantum Electronics, vol. QE-13, No. 4, Apr. 1977, pp. 122-128.
H. Heidrich et al., "Integrated Optical Compensator on Ti:LiNbO$_3$ for Continuous and Reset-Free Polarization Control", ECOC 1987, Proc., vol. 1, pp. 257-260.
R. Noé et al., "Automatic Endless Polarization Control with Integrated-Optical Ti:LiNbO$_3$ Polarization Transformers", Optics Letters, Jun. 1988, vol. 13, No. 6, pp. 527-529.
N. G. Walker et al., "Endless Polarisation Control Using an Integrated Optic Lithium Niobate Device", Electronics Letters, Mar. 3, 1988, vol. 24, No. 5, pp. 260-268.
M. Minakata et al., "Precise Determination of Refractive-Index Changes in Ti-Diffused LiNbO$_3$ Optical Waveguides", J. Appl. Phys., 49(9), Sep. 1978, pp. 4677-4682.
C. H. Bulmer, W. K. Burns, "Polarization Characteristics of LiNbO$_3$ Channel Waveguide Directional Couplers", Journ. Lightwave Tech., vol. LT-1, No. 1, Mar. 1983, pp. 227-236.
M. Kondo et al., "Low-Drive-Voltage and Low-Loss Polarisation-Independent LiNbO$_3$ Optical Waveguide Switches", Electronics Letters, vol. 23, No. 21, Oct. 8, 1987, pp. 1167-1169.
R. C. Alferness, "Polarization-Independent Optical Directional Coupler Switch Using Weighted Coupling", Appl. Phys. Lett., 35(10), Nov. 15, 1979, pp. 748-750.
O. G. Ramer, C. Mohr, J. Pikulski, "Polarization-Independent Optical Switch with Multiple Sections of $\Delta\beta$ Reversal and a Gaussian Taper Function", IEEE Journal Quantum Electronics, vol. QE-18, No. 10, Oct. 1982, pp. 1772-1779.
L. McCaughan, "Low Loss Polarization Independent Elecrooptical Switching at $\lambda=1.3$ $\mu$m", IEEE Journ. Lightwave Tech., vol. LT-2 (1984), pp. 51-55.
Y. Bourbon et al., "Polarisation-Independent Modulators with Ti:LiNbO$_3$ Strip Waveguides", Electronics Letters, vol. 20, No. 12, Jun. 7, 1984, pp. 496-497.
J. E. Watson, "A Low-Voltage Polarization-Independent Guided-Wave Direction-Coupler Switch in Lithium Niobate", SPIE, vol. 835, Integrated Optical Circuit Engineering V (1987), pp. 132-135.
N. Tsukada, T. Nakayama, "Polarization-Insensitive Integrated-Optical Switches: A New Approach", IEEE Journal Quantum Electronics, vol. QE-17, No. 6, Jun. 1981, pp. 959-964.
J. E. Watson et al., "A Polarization-Independent 1×16 Guided-Wave Optical Switch Integrated on Lithium Niobate", Jour. Lightwave Tech., vol. LT-4, No. 11, Nov. 1986, pp. 1717-1721.
W. K. Burns, T. G. Giallorenzi, R. P. Moeller, E. J. West, "Interferometric Waveguide Modulator with Polarization-Independent Operation", Applied Physics Letters, vol. 33, No. 1, Dec. 1, 1978, pp. 944-947.

(List continued on next page.)

*Primary Examiner*—Akm E. Ullah
*Attorney, Agent, or Firm*—Burns, Doane, Swecker & Mathis

[57] ABSTRACT

An X-cut or near Y-cut monocrystalline wafer of electro-optical material forms a substrate of a digital optical switch. Waveguides of LiNbO$_3$ are diffused into the wafer to form ribbon waveguides such that light propagates in a direction near the Z axis of the wafer. These waveguides form a Y-shape, refractive indices of which are controlled by electrodes formed closely adjacent thereto.

52 Claims, 5 Drawing Sheets

OTHER PUBLICATIONS

P. Granestrand, B. Stoltz, L. Thylén, "Polarization Independent Integrated Optics Switches", Fourth European Conference on Integrated Optics, 1987, pp. 36-39.

P. Granestrand, L. Thylén, B. Stoltz, "Polarisation Independent Switch and Polarisation Splitter Employing $\Delta\beta$ and $\Delta\kappa$ Modulation", Electronics Letters, vol. 24, No. 18, Sep. 1, 1988, pp. 1142-1143.

J. L. Nightingale et al., "Low-Voltage, Polarization-Independent Optical Switch in Ti-Indiffused Lithium Niobate", Integrated and Guided-Wave Optics, 1989 Technical Digest Series, vol. 4, paper MAA3, pp. 10-13.

K. Takizawa et al., "Polarization-Independent and Optical-Damage-Insensitive $LiNbO_3$ Interferometric Waveguide Modulator", Japanese Journ. Appl. Phys., vol. 27, No. 4, Apr. 1988, pp. L696-L698.

H. Yajima, "Dielectric Thin-Film Optical Branching Waveguide", Appl. Phys. Lett., vol. 22, No. 12, Jun. 15, 1973.

W. K. Burns and A. F. Milton, "Mode Conversion in Planar-Dielectric Separating Waveguides", IEEE Journ. Quantum Electronics, vol. QE-11, No. 1, Jan. 1975, pp. 32-35.

P. Granestrand et al., "Integrated Optics 4×4 Switch Matrix with Digital Optical Switches", Electronics Letters, vol. 26, No. 1, Jan. 4, 1990, pp. 4-5.

Y. Silberberg et al., "Digital Optical Switch", Tech. Digest OFC, 1988, paper THA3.

R. A. Spanke, "Architectures for Large Nonblocking Optical Space Switches", IEEE Journ. Quantum Electronics, vol. QE-22, No. 6, Jun. 1986, pp. 964-967.

H. F. Taylor, "Polarization Independent Guided-Wave Optical Modulators and Switches", Journ. Lightwave Tech., vol. LT-3, No. 6, Dec. 1985, pp. 1277-1280.

T. Pohlmann, A. Neyer, and E. Voges, "Polarization-Independent Switches on $LiNbO_3$", Proceedings of the Topical Meeting on Integrated Photonics Research, Hilton Head, S.C., 1990, pp. 38-39.

R. A. Steinberg and T. G. Giallorenzi, "Design of Integrated Optical Switches for Use in Fiber Data Transmission Systems", IEEE Journ. Quantum Electronics, vol. QE-13, No. 4, Apr. 1977, pp. 122-128.

H. Kogelnik and R. V. Schmidt, "Switched Directional Couplers with Alternating $\Delta\beta$", IEEE Journ. Quantum Electronics, vol. QE-12, No. 7, Jul. 1976, pp. 396-401.

W. K. Burns and J. Warner, "Mode Dispersion in Uniaxial Optical Waveguides", Journ. Optical Soc. of America, vol. 64, No. 4, Apr. 1974, pp. 441-446.

J. Ctoroky, M. Cada, "Guided and Semileaky Modes in Anisotropic Optical Waveguides of the $LiNbO_3$ Type", Optics Communications, vol. 27, No. 3, Dec. 1978.

NEAR Z DIGITAL SWITCH

BACKGROUND OF THE INVENTION

1) Field of the Invention

The invention relates to an integrated optical circuit using thin film optical waveguides for modulating or switching a light signal by an electro-optic effect and, more particularly, to a X- or almost Y-cut, near Z propagating digital optical switch.

2) Description of Related Art

The growing utilization of optical fibers in communications, sensors and other applications has made optical switching a subject of great interest. Of particular interest is the switching of signals in optical form without electro-optical transformations. Attempts have been made in a number of directions, such as by using mechanical switches and integrated optical semiconductor switches made of semiconductor material such as GaAs and InP.

Many of these switches use an electro-optical effect for the switching function. A quadratic or Kerr electro-optical effect is present in all substances and refers to a change in refractive index $\Delta n$ proportional to a square of the applied electric field E. Much larger index changes can be realized in single crystals that exhibit a linear or Pockel's electro-optic effect. In this case the change of refractive index $\Delta n$ is directly proportional to the applied electric field E. The effect is present only in noncentrosymmetric single crystals, and the induced index change depends upon the orientation of the electric field E and the polarization of the light beam. Well known linear electro-optic materials include potassium dihydrogen phosphate (KDP) and its deuterated isomorph (DKDP or KD*P), lithium niobate ($LiNbO_3$) and lithium tantalate ($LiTaO_3$), and semi-conductors such as gallium arsenide (GaAs) and cadmium telluride (CdTe).

To date, one of the most mature technologies for fabrication of integrated optics circuits (IOC's) is Ti:-$LiNbO_3$, which involves a ribbon guide formed by diffusing titanium into lithium niobate. The lithium niobate guide is formed in a monocrystalline wafer upon which longitudinal electrodes are placed adjacent the ribbon guide. The electrodes modify the local value of the refractive index when a potential difference is applied.

In this technology, relatively low loss channels with good spot-size matching to single mode fibers can be conveniently fabricated. However, there is one important problem; the $LiNbO_3$ components are inherently polarization dependent, i.e., they require excitation of a specific linear polarization ("ordinary" transverse electric mode TE or "extraordinary" transverse magnetic mode TM, for a Z-cut example), dependent on crystal orientation, whereas the state of polarization (SOP) at the output of a single mode fiber will exhibit a random behavior. This problem is usually solved by using techniques adapted to accommodate the inherent polarization dependency of the $LiNbO_3$ components, which serves to complicate the systems.

There are a number of concepts for polarization independent switches and modulators. See, e.g., M. Kondo et al, "Low Drive Voltage and Low Loss Polarization Independent $LiNbO_3$ Optical Waveguide Switches," Electron. Lett., Vol 23, (1987), pp 1167-1169; R. C. Alferness, "Polarization Independent Optical Directional Coupler Switch Using Weighted Coupling," Appl. Phys. Lett., Vol 35, (1979), pp 748-750; O. G. Ramer et al., "Polarization Independent optical Switch with Multiple Sections of $\Delta\beta$ Reversal and a Gaussian Taper Function, " IEEE Journ. Quantum Electron. Vol QE-18 (1982), pp 1772-1779; L. McCaughan, "Low Loss Polarization Independent Electrooptical Switching at $\lambda=1.3$ $\mu m$," IEEE Journ. Lightwave Techn., Vol LT-2, (1984), pp 51-55; Y. Bourbon et al., "Polarization-Independent Modulator with Ti:$LiNbO_3$ Strip Waveguides," Electron. Lett. Vol 20, (1984), pp 496-497; N. Tsukada et al., "Polarization-Insensitive Integrated-Optical Switches: A New Approach," IEEE Journ. Quantum Electron., Vol QE-17, (1981), pp 959-964; J. E. Watson, "A Low-Voltage Polarization Independent Guided Wave Direction-Coupler switch in Lithium Niobate," SPIE Vol 835, Integrated Optical Circuit Engineering V, (1987), pp 132-135; J. E. Watson et al., "A polarization Independent $1 \times 16$ Guided-Wave Optical Switch Integrated on Lithium Niobate," Journ. Lightwave Techn., Vol LT-4, (1986), pp 1717-1721; W. K. Burns et al., "Interferometric Waveguide Modulator with Polarization-Independent Operation," Applied Physics Letters, Vol 3, (1978), p 944; P. Granestrand et al., "Polarization Independent Optical Switches," Fourth European Conference on Integrated Optics (ECIO '87) pp 36-39; P. Granestrand et al., "Polarization Independent Switch and Polarization Splitter Employing $\Delta\beta$ and $\Delta\beta$ Modulation, " Electron. Lett. 1988, 1142-1143; J. L. Nightingale et el, "Low-Voltage Polarization Independent Optical Switch in Ti-indiffused Lithium Niobate," Techn. Digest of Integrated and Guided Wave Optics Conf. (IGWO '89), paper MAA3, pp 10-13; K. Takizawa et al., "Polarization-Independent and Optical Damage-insensitive $LiNbO_3$ Interferometric Waveguide Modulator," Japanese Journal of Applied Physics, Vol 27, (1988), pp L696-L698; Y. Silberberg et al., "Digital Optical Switch," Techn. Digest OFC 1988, paper THA3; H. F. Taylor, "Polarization Independent Guided wave Optical Modulators and Switches," IEEE Journ. Lightwave Techn., Vol LT 3 (1985), pp 1277-1280; T. Pohlmann et al., "Polarization independent switches on $LiNbO_3$," Proceedings of the Topical Meeting on Integrated Photonics Research, Hilton Head, SC, 1990, pp 38-39. The first experimental results on polarization independent switches were reported by Alferness in 1979.

An approach to making polarization independent switches is to utilize crystal orientations where the conditions are similar for the two polarizations. This means that the electro-optically induced perturbations are equal and that the TE and TM modes have approximately the same coupling lengths. The "isotropic" orientations with the Z-axis in the propagation direction are examples of such orientations. Here both polarizations see the ordinary refractive index and therefore the index perturbations due to titanium (Ti) concentration are equal for the two polarizations. This means that the coupling lengths are approximately equal. The electro-optically induced index perturbations for the two polarizations are caused by the electro-optic r-coefficients $r_{12}$ and $r_{22}$ (contracted index notation). They have equal magnitudes but opposite signs and the index 2 which is common in $r_{12}$ and $r_{22}$ implies that these perturbations correspond to external electrical fields along the Y-axis. One complicating factor in this context is the fact that the two polarizations are almost synchronous and that there is one electro-optic coefficient (of the same magnitude as $r_{12}$ and $r_{22}$) which performs a coupling between the two polarizations. This r-coefficient is $r_{61}$, indexed 1, 2, 1 in non-contracted notation. The index 6 (1,2 non-contracted) corresponds to coupling between electrical fields along the X and Y axis directions (the notation format is explained below). The coupling is induced by an external electrical field along the X axis as indicated by the second listed index.

To get good performance in a switch in this orientation, this TE-TM conversion must be avoided. However, since the unwanted (TE→TM) and the wanted ($\Delta n_{TM}$, $\Delta n_{TE}$) perturbations corresponds to different components of the external field, it is possible to avoid this coupling by proper design of the component.

One advantage with Z-propagating concepts is that the same index (ordinary) is seen by the two different polarizations. Therefore, there will be no bandwidth degradation due to pulse broadening which occurs when different indices are seen by the two polarizations.

This index difference (which implies different velocities for the portions of a pulse in the TE and TM polarizations, respectively) will appear when crystal orientations with the Z axis perpendicular to the propagation direction is used and will limit the permitted bitrate to approximately 10 Gbit/s per channel for a 10 cm long chip in these orientations. However, if the information is stacked by some other principle, such as wavelength division multiplexing or by coherent techniques, information band-widths in the THz-range can be switched even with switches in these orientations.

Another advantage with the Z-propagating concepts is that both polarizations will have approximately the same transfer function (in general, for other concepts the polarization independency means that it is possible to put the switch in two polarization independent switch states but without independency in "intermediate" points) This is most important, e.g., when linear (small signal) modulation applications are considered.

All of the switch types mentioned above are so called interferometric switches; they are based on constructive and destructive interference of modes, therefore they all have oscillating transfer functions. There is, however, another possibility, and that is to use devices which are based on mode sorting instead of interferometry. See, W. K. Burns et al., "Mode Conversion in Planar Dielectric separating Waveguides", IEEE Journ. of Quantum Electron., Vol QF-11 (1975), pp 32-35, and Y. Silberberg et al., "Digital optical Switch," Tech. Digest OFC, 1988, paper THA3.

FIG. 1 shows a mode sorting switch 100. It is a 2×2 digital optical switch and consists of an asymmetrical Y-branch waveguide 101 at one side and a symmetrical Y-branch waveguide 102 at the other. The latter branch 102 can be made asymmetric by applying an electrical field via the electrodes 103 and 104. An asymmetric Y-branch 101 performs mode sorting, given that the transformation is "adiabatic" (sufficiently slow). The mode sorting here means that the channel mode in the input waveguide with highest effective index gradually transforms along the branch to the first order local normal mode (fundamental mode) of the two mode region where the channels are near and influence each other (there is no power transfer between the local normal modes; at large separation the first order mode has the shape of the channel mode). In the same way, the mode in the other channel transforms to the second order mode (i.e., first higher order mode). Thus, the signal in the wide channel transforms to the first order mode in the middle region and the signal in the narrower channel transforms to the second order mode of the middle region. If the other half 102 of the switch 100 is also asymmetric (i.e., an odd index perturbation is induced) by applying a voltage to the electrodes 103 and 104 in a similar way, the first order mode in the middle region (corresponding to the wide input channel) transforms to the output channel with highest index and conversely the second order mode transforms to the output channel with lowest index.

Since the output Y-branch asymmetry can be electro-optically altered the device works as a 2×2 switch provided that the index perturbation is large enough and the transformation is adiabatic. If zero voltage is applied to the electrodes, a 3 dB splitting will occur for both signals.

In FIG. 2 a transfer function for a X-cut digital optical switch for TE (solid line) and TM (dashed line) is shown (note the difference). As can be seen, the transfer function does not have the oscillatory behavior of interferometric switches and the switch will operate independent of polarization assuming that the magnitude of the drive voltage is high enough.

A significant advantage of the digital optical switch is its superb stability performance. The instabilities caused by DC drift and temperature variations appear as variations of the "effective" applied voltage, and the digital response with its small transfer function slope attenuates the induced switch state perturbation if an operating point with sufficiently high voltage magnitude is chosen.

Another advantage of the digital optical switch is the power splitting achieved at zero voltage. This is especially important when broadcasting operation is requested, e.g., in some switch matrix applications.

FIG. 3 shows a switch matrix structure in which the digital switch is a very attractive choice of switch element. See, R. A. Spanke, "Architectures for Large Non-blocking Optical Space Switches," IEEE Journ. of Quantum Electron., Vol QE-22 (1986), pp 964-967. Here 1×2 switches are needed, which means that the switch described above can be simplified to the 1×2 digital optical switch structure of FIG. 4 (X-cut example).

In the switch shown in FIG. 4, the signal in the incoming single mode channel 131 excites the first order mode of the two mode region 132, and this mode is transformed (as described above) to the output with highest effective index by application of an appropriate electric field via three electrodes 133, 134, 135 (i.e., 133 and 135 being grounded and 134 being at positive or negative potential with sufficient magnitude, or 134 being grounded and 133 and 135 being at positive or negative potential with sufficient magnitude). The structure of FIG. 3 has good cross-talk properties because a signal must go wrong in two switches before it reaches an unwanted output if the matrix is properly set (this is not true in passive splitting-active combining operation as further explained infra). See, the Spanke article.

The good cross-talk performance of the structure relaxes the cross-talk requirement on the individual switch elements, which is advantageous because it is probably more difficult to achieve extremely low cross-talk with the digital optical switch than with an electronically adjustable directional coupler such as shown in the Granestrand et al. article.

Another important feature of a switch matrix due to FIG. 3 with digital optical switches as switch elements is the possibility to conveniently implement broadcast functions where the signal from one input is distributed to several outputs. In this case some (or all) of the switches in the first half of the matrix is set to 3 dB power splitting which in the case of the digital optical switch is reached at zero voltage.

Each of the couplers or switches described above suffer drawbacks such as complex fabrication, elaborate implementation and/or control, limited bitrate capacity and undue sensitivity to the environment.

SUMMARY OF THE INVENTION

One aspect of the invention is an improved drive voltage uniformity for the two polarizations combined with large tolerance for drive voltages variations. This tolerance is closely related to the stability performance. The switch states are relatively insensitive to a variation of the drive voltages in the vicinity of the operation point and so the switch also has good stability performances because the effect of temperature variations, for example, manifests as a variation of the "effective" voltage. Thus, the drive complexity (number of drivers, tolerance of voltages) is reduced.

Other aspects of the invention are improved fabrication tolerances and cross-talk (which are related), and a large bandwidth, both instantaneous bandwidth (corresponding to maximum bitrate of a signal routed through the switch) and total bandwidth (corresponding to the total wavelength region possibly containing many channels which can be switched simultaneously).

The present invention alleviates several other drawbacks of conventional digital optical switches. For instance, the bitrate limitation mentioned above due to the difference in effective index between the two polarizations is reduced. Also, the present invention alleviates the drawback of having transfer functions that are different for the two polarizations due to the fact that the two polarizations would normally see different electro-optic coefficients. Additionally, the present invention alleviates the effect of the polarization which normally sees the extraordinary refractive index. This part of the signal would be subject to a surface guide, caused by the out diffusion of Li, which would deteriorate the performance of the switches in a switch matrix, for example. In the present invention however, this is avoided due to the orientations chosen.

These and other aspects of the invention are achieved by the present invention, which involves an X-cut or near Y-cut monocrystalline wafer of electro-optical material forms a substrate of a digital optical switch. Waveguides of Ti:LiNbO$_3$ are diffused into the wafer to form ribbon waveguides. These waveguides form a Y-shape, refractive indices of which are controlled by electrodes formed closely adjacent thereto.

BRIEF DESCRIPTION OF THE DRAWINGS

The invention will now be described in detail with reference to the drawings wherein.

DESCRIPTION OF THE PREFERRED EMBODIMENTS

When optical switches are fabricated in Ti:LiNbO$_3$, a crystal orientation is usually selected which makes possible use of the strongest electro-optic r-coefficient ($r_{33}$ in contracted index notation, $r_{333}$ in non-contracted notation) corresponding to a change in the refractive index in the Z-direction due to an applied field in the Z direction. These orientations are Z-cut, X or Y propagating, Y-cut, X-propagating and X-cut, Y-propagating. As an example, Z-cut, Y-propagating means that the light channels are aligned so that propagation is mainly in the Y-direction in the crystal and that the surface is perpendicular to the Z axis. In these orientations, the Z axis is perpendicular to the propagation direction.

One difference between the present invention and the prior art is the orientation of the Z axis relative to the propagation direction. In the present invention, the propagation direction is near parallel to the Z axis, rather than along the X- or Y- axes.

Figure 8:
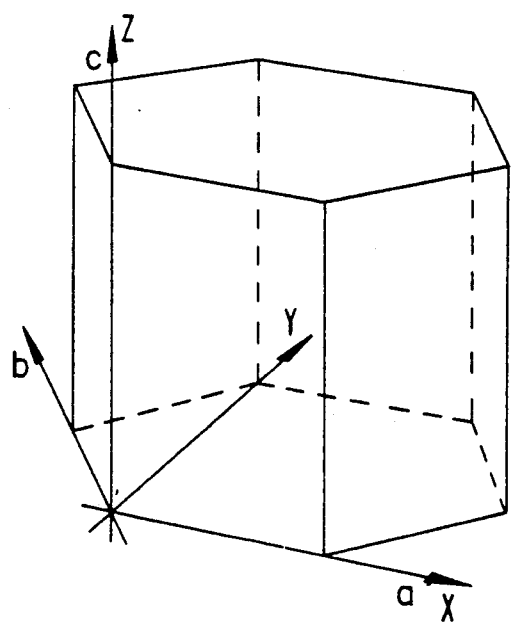
FIG. 8 shows crystal structure and orientation of coordinate systems in LiNbO$_3$.

Wafer material of, e.g., lithium niobate, has a crystal structure. FIG. 8 shows the orientation of right-angular, right-handed coordinate system X, Y, Z which is associated with a crystallographic a, b, c coordinate system. The axes in this coordinate system have been selected such that the X axis points in the direction of the crystallographic a axis and the Z axis in the direction of the crystallographic c axis, which is the optical axis. Lithium niobate has double refractive indices and its refractive indexes described by a rotational ellipsoid. The intersection of the ellipsoid with the X, Y plane is a circle, and its intersection with the X, Z plane is an ellipsoid, the major axis of which is the diameter of the circle. A monochromatic light beam in the direction of the Z-axis is effected in the crystal by a refractive index with the magnitude corresponding to the radius of the circle. The magnitude of the refractive indexes are independent of the light beam polarization direction, and all polarization directions of the light beam propagate themselves through the crystal at the same rate. As opposed to that, a light beam propagating in other directions will have eigen-polarizations subject to refractive indices of different magnitudes, these magnitudes will depend on the angle between the propagation direction and the Z axis. Light beams having the same direction but different polarization planes propagate themselves through the crystal at different rates. The result of this is that a light pulse containing power in both eigen-polarizations will have the pulse lengthened when it passes through the crystal, if the propagation direction deviates from the Z-axis direction. In turn, the pulse lengthening limits the high pulse frequency with which a component made from a crystal material may work.

To obtain a component with high upper pulse frequency, the orientation of the wafer is selected such that the direction of the waveguides 181–183 substantially coincide from that of the Z-axis, in accordance with the present invention. The oscillation modes in the light wave, the TE mode polarized parallel with the surface and the TM mode polarized perpendicular to the surface, will in this case have approximately common propagation rates. The degree at which light travels in any given waveguide, may be affected by an induced electric field in the crystal. The electric field changes the shape of the refractive index ellipsoid in accordance with the Pockel's effect for weak electric fields.

The changes described mathematically in most general three-dimensional cases by a third rank tenser, with 27 tenser elements. These are usually denoted $r_{ij,k}$ where the indices i, j, and k are assumed valued 1, 2 or 3. The indices refer to the right-angular, right-hand coordinate system. (Often the two first indices are grouped together in so called contracted indices: 1,1 is denoted 1; 2,2 is denoted 2; 3,3 is denoted 3; 2,3 is denoted 4; 1,3 is denoted 5; 1,2 is denoted 6.) The tenser elements $r_{i,j,k}$ have physical dimensions of length per electrical potential difference (meters per volt), which is the measure of the change between the oscillation modes achieved by the electrical field. These changes of the refractive index affect the oscillation modes TM and TE so that switching can be performed.

In accordance with the invention, the optical switch is independent of polarization. The orientation of the monocrystalline wafer is selected in the following way.

When a channel orientation is selected which is not along the crystallographic X, Y or Z axes, the "effective" electro-optic tensor (seen by the two polarizations in the channel) will be a linear combination of the "conventional" r-coefficients (in the X, Y, Z (1,2,3) system).

Figure 6:
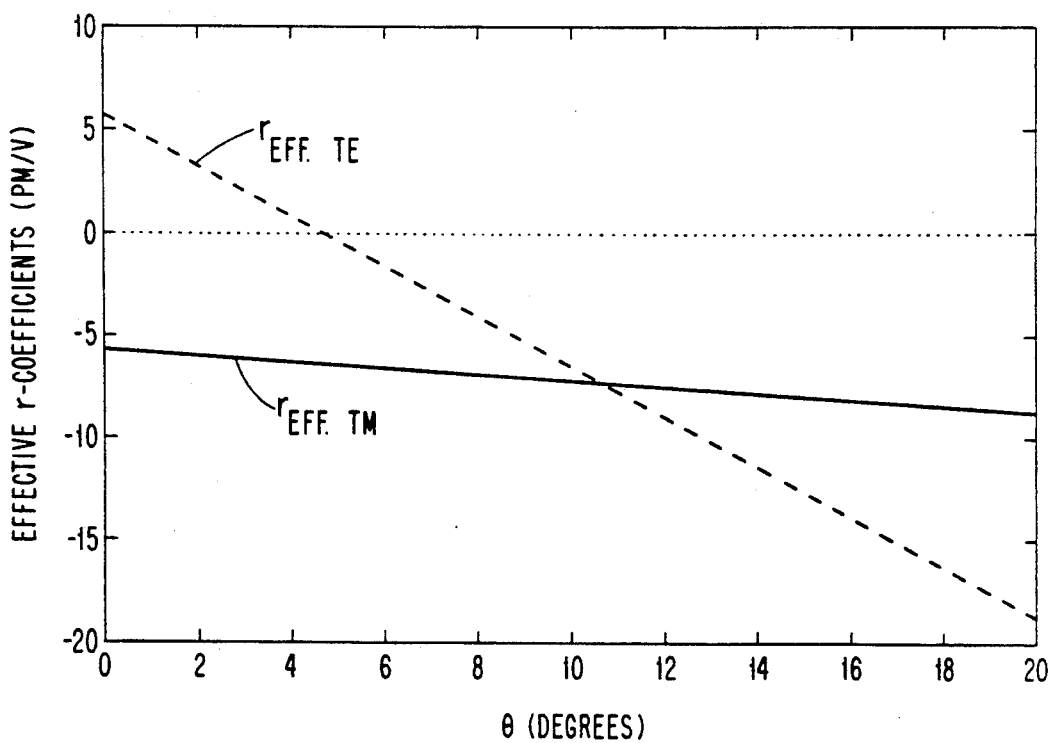
FIG. 6 is a graph of the effective r-coefficients of the switch shown in FIG. 5 as a function of the angle between the Z axis and the propagation direction.

FIG. 6 shows the effective r-coefficients for the two polarizations seen by the channel modes when a propagation direction in the neighborhood of the Z axis is chosen within the Y-Z plane with the channel center axis pointing in a direction between the negative Y axis and the positive Z axis deviating an angle $\theta$ from the latter. As can be seen, at $\theta=0$ the r-coefficients will have different signs which means that the pure Z propagation orientation can not be used in conjunction with the digital optical switch (because it would route different polarizations to different ports, it would be a polarization splitter, not a switch). If, however, the angle $\theta$ is raised to approximately 10 degrees the same magnitude and sign of the effective electro optic coefficients will be achieved. Therefore, this propagation direction can be used for digital optical switches. Note that this only defines the propagation direction, the crystal cut can be chosen in two fundamentally different ways which both are of interest (the reason that only two crystal cuts are interesting is that it must be possible to provide the pertinent electric field via the electrodes). There are, of course, crystal cuts which are equivalent to the ones described here (e.g., when the substrate is placed upside-down in any of the cuts proposed or the light propagation direction is reversed).

The crystal cut proposed in the first embodiment of the invention is X cut, with a channel orientation corresponding to equal effective r-coefficients for the two channel modes (or nearly equal, precise operation on the "equal" point is not necessary) as shown in FIG. 6. The reasons for this choice of crystal cut is that X cut material is a standard orientation which makes this choice a simple one to use practically.

Figure 1:
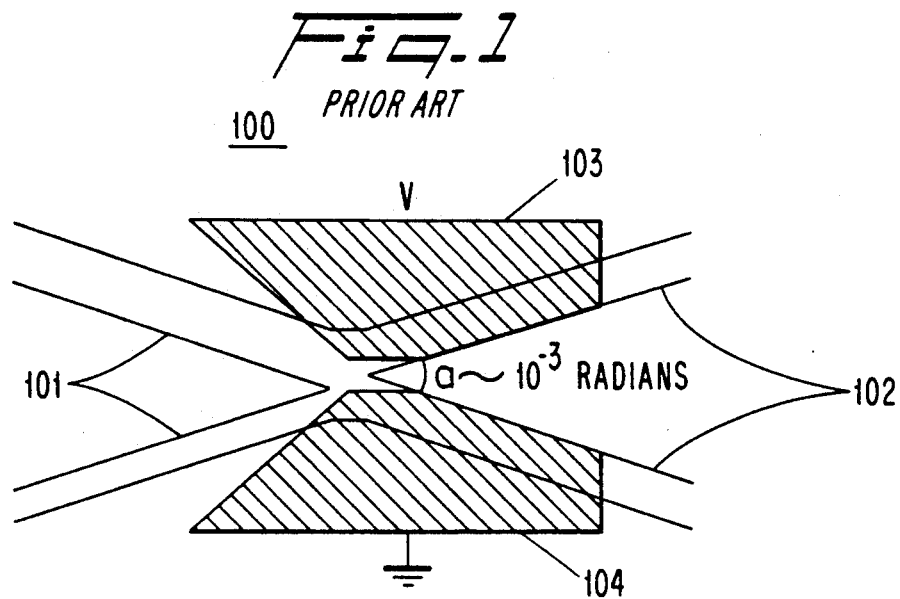
FIG. 1 represents a conventional digital optical 2×2 switch.
Figure 2:
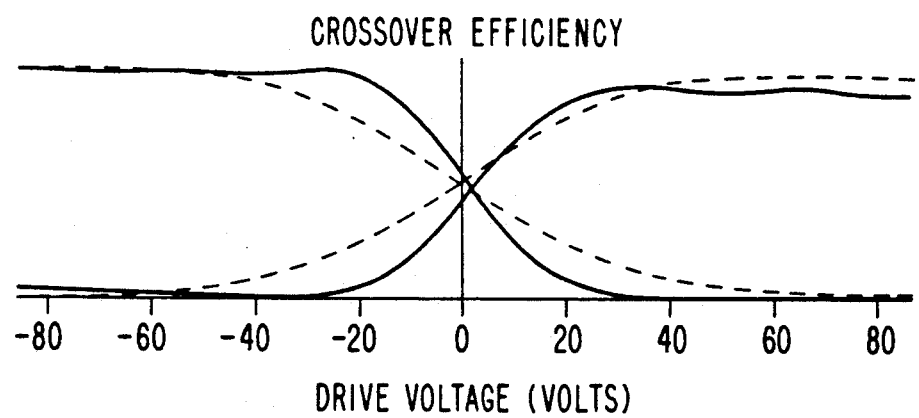
FIG. 2 is a graph of an experimental transfer function for a digital optical switch shown in FIG. 1.
Figure 3:
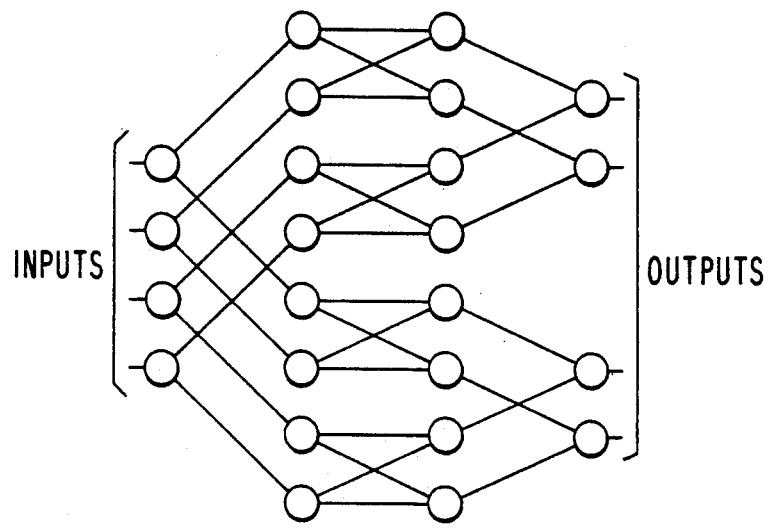
FIG. 3 represents a switch tree structure.
Figure 4:
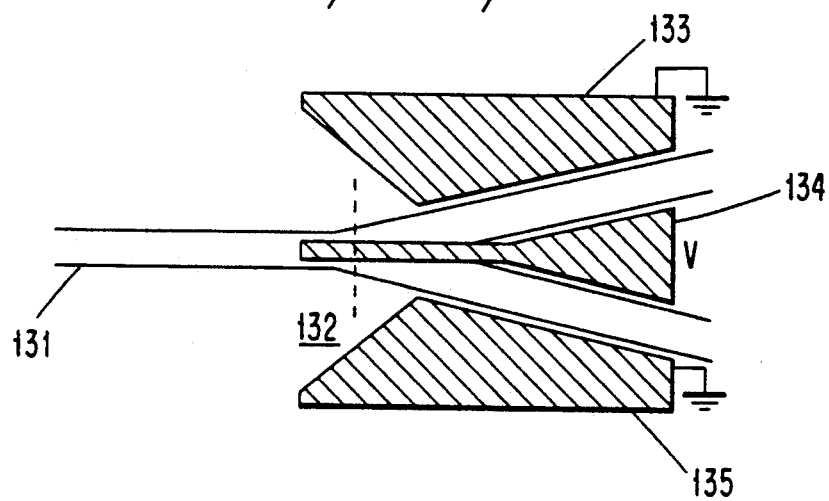
FIG. 4 represents a 1×2 digital optical switch used in the tree structure shown in FIG. 3.
Figure 5:
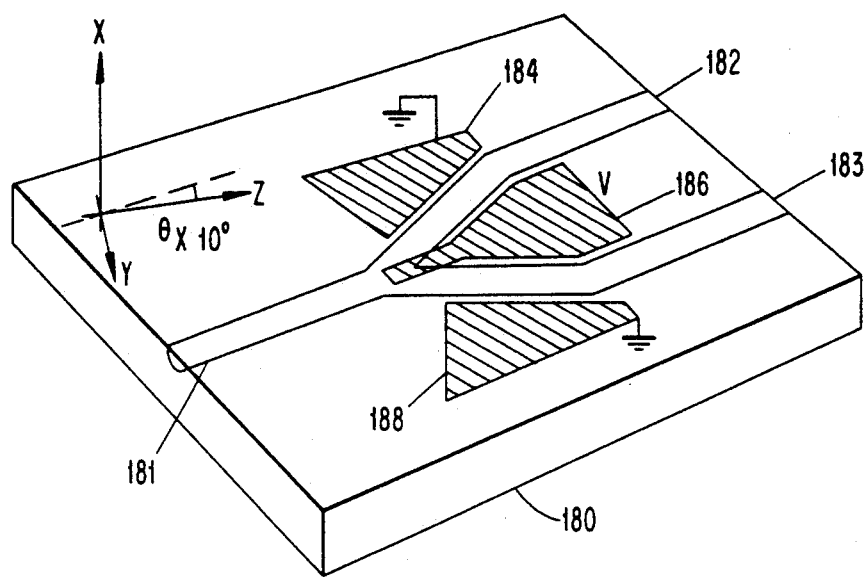
FIG. 5 represents a first embodiment of a digital optical switch in accordance with the present invention using a X-cut, near Z-propagating digital optical switch.

FIG. 5 represents a first embodiment of a digital optical switch in accordance with the present invention. The switch is composed of an X-cut, monocrystalline wafer 180 of electro-optic material, upon which are formed ribbon waveguides 181–183 formed by diffusion of Ti into the LiNbO$_3$ electro-optic material. The waveguides 181–183 are formed in the shape of a Y, and include a first waveguide 181 at an upper surface of the wafer which is near parallel to the Z axis of the wafer. This first waveguide 181 forms the leg of the Y-shape. Second and third waveguides 182, 183 are formed at an upper surface of the wafer. The second and third waveguides 182, 183 form the arms of the Y shape, by intersecting at an intermediate location with the first waveguide 181. A first electrode 186, to which a voltage is applied, is formed in the crux of the Y-shape. The first electrode 186 is formed on the upper surface of the wafer 180 and is substantially bounded by the second and third waveguides 182, 183. Second and third electrodes 184, 188 are formed adjacent to the outer edges or boundaries of the second and third waveguides 182, 183 which form the arms of the Y-shape. These electrodes 184, 186 are grounded and opposite in position to the first electrode 186 relative to the second and third waveguides 182, 183. Generally, the electrode(s) to be grounded and the electrode(s) given a potential can be exchanged.

When a strong voltage is applied to the first electrode 186, the induced electromagnetic field changes the refractive indices of the waveguides, thus switching the incoming light from one waveguide to another in a manner known to those skilled in the art.

A propagating direction of the waveguides 181–183 forms an angle $\theta$ to the Z-axis of the wafer 180. This angle is an acute angle $\theta$, preferably between 0 and 20 degrees. Optimally, the acute angle $\theta$ formed between the propagation direction of the first waveguide 181 and the Z axis is approximately 10 degrees as mentioned supra.

As mentioned above, FIG. 6 illustrates the effective r-coefficients (electro-optic coefficients projected on the directions perpendicular to the propagation direction) for an orientation due to the structure shown in FIG. 5, as a function of the angle $\theta$ between the Z axis and the propagation direction. The dashed line represents TE mode and the solid line represents TM mode. As can be seen, an angle $\theta$ between the Z axis and the propagation direction of approximately 10 degrees is optimal for this specific embodiment.

The two polarizations see an effective r-coefficient that are equal both in sign and magnitude. In the "pure" Z-propagation, they are equal in magnitude but opposite in sign. Similar r-coefficients imply that the transfer functions will be similar for two polarizations, thus making small signal modulation possible. Because the effective refractive indices seen by the two modes are much closer to each other as compared with orientations where the Z axis is perpendicular to the propagation direction, the bandwidth limitation mentioned above will not be evident unless much higher bit rates is used. Also, since the light see essentially an ordinary index, the problem of out-diffusion will be much less severe. On one hand, these advantages are achieved at the expense of higher drive voltages, in order of 30% higher than conventional polarization independent, digital optical switches. On the other hand, the semi-leaky modes that are present in the orientation of FIG. 5 may cause high excess losses for TE polarization due to the polarization coupling to substrate modes, i.e., an excess loss due to TE-TM coupling (described in J. Ctoroky, M. Cada, "Guided and Semileaky Modes in Anisotropic optical Waveguides of the LiNbO3 Type," *Optics Communications*, Vol. 27, (1978), pp 353-356). If, however, the crystal orientation is rotated 90 degrees around the propagation direction, the result is an orientation which does not suffer from this drawback (See, e.g., the Ctoroky article with references). The resulting orientation will be a near Y-cut, near Z-propagation case which corresponds to the second version of the present invention. (Note that in FIG. 6, a X-cut case is assumed which manifests in the assignment of TE and TM polarizations.) A switch utilizing this orientation and correct r-coefficients is shown in FIG. 7.

Figure 7:
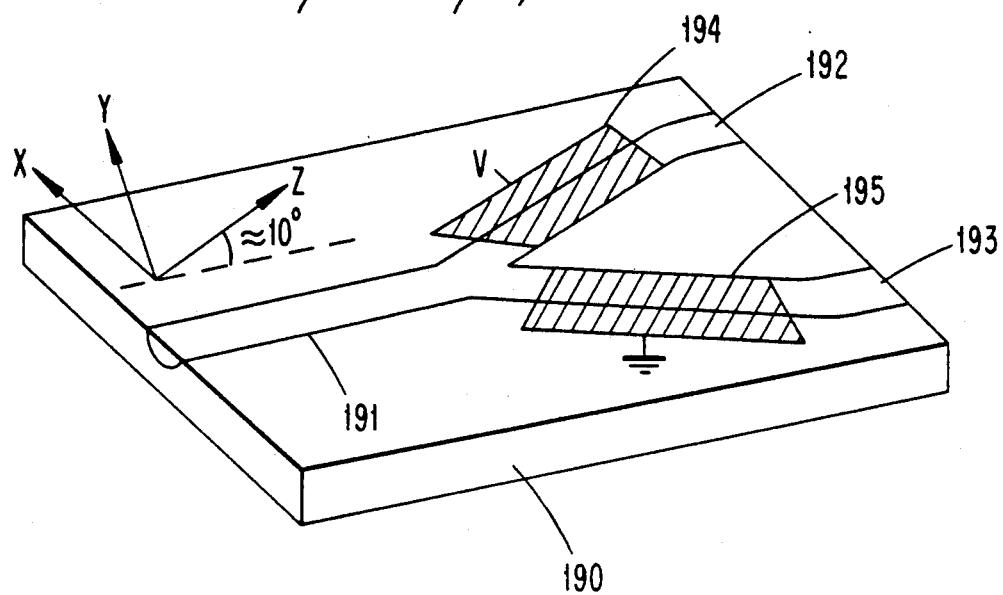
FIG. 7 represents a second embodiment of the invention using a near Y-cut, near Z propagating digital optical switch.

FIG. 7 illustrates a near Y-cut, near Z-propagating digital optical switch. In this orientation, the excess loss due to semi-leaky modes that may affect the switch of FIG. 5 will be avoided. In this embodiment of the present invention, the optical switch includes a near Y-cut, monocrystalline wafer 190 of LiNbO3 electro-optic material with the X axis in the plane of the surface.

A first waveguide 191 at an upper surface of the wafer is oriented to be near parallel to the Z axis of the wafer 190. Second and third waveguides 192, 193 formed at an upper surface of the wafer 190 to intersect with the first waveguide 191 thus forming the arms and leg of a Y-shape. A first electrode 194 is placed on the surface of the wafer to substantially coincide with a portion of the second waveguide 192, while a second electrode 195 is placed adjacent to and substantially coincides with the third waveguide 193. The first electrode 194 may receive a voltage while the second electrode 195 is grounded. By selective application of relatively high voltage to the first electrode 194, the indices of refraction are controlled, thus controlling the propagation of light in the ribbon waveguides.

The first, second, and third waveguides 191-193 are formed by diffusing Ti into the LiNbO3 wafer.

The first waveguide 191 is at an acute angle $\theta$ relative to the Z axis of t,he wafer. The acute angle $\theta$ has a value in the range of 0-20 degrees, preferably. Optimally, the acute angle $\theta$ is approximately 10 degrees, for the reasons explained above. Similarly, the normal of the wafer 190 has an orientation of 0-20 degrees and preferably approximately 10 degrees to the Y-axis of the material. A drawback of this switch is the special crystal-cut required to provide a near Y-cut. Otherwise, this switch displays an enhanced total bandwidth and stability, increased instantaneous bandwidth (almost the same effective indices for both polarization), good linearity (same r-coefficients), reduced out-diffusion, and reduce semi-leaky mode access loss.

Typically there is a voltage length product which is constant for a specific type of switch element, orientation and waveguide parameters. This means that if the length of the device is doubled (e.g., the divergence angle in the Y-branch of the digital optical switch is doubled) the voltage required to achieve a specific switch state can be halved. Typical figures for a LiNbO3 digital optical switch is +/−60 Volts to switch the ordinary polarization (which requires higher voltages) for approximately −15 dB crosstalk (for a X cut, Y propagating example) in a switch with 0.004 radians divergence angle (angle between legs in Y branch). For the present invention, somewhat higher voltages can be expected (in the order of 30 percent higher).

The range for the acute angle can be 0 to 20 degrees to cover the interesting cases. As can be seen in FIG. 6, when this angle is very small (say, less than 4 degrees) the correct relative sign of the effective electro-optic coefficients is not obtained.

Figure 9:
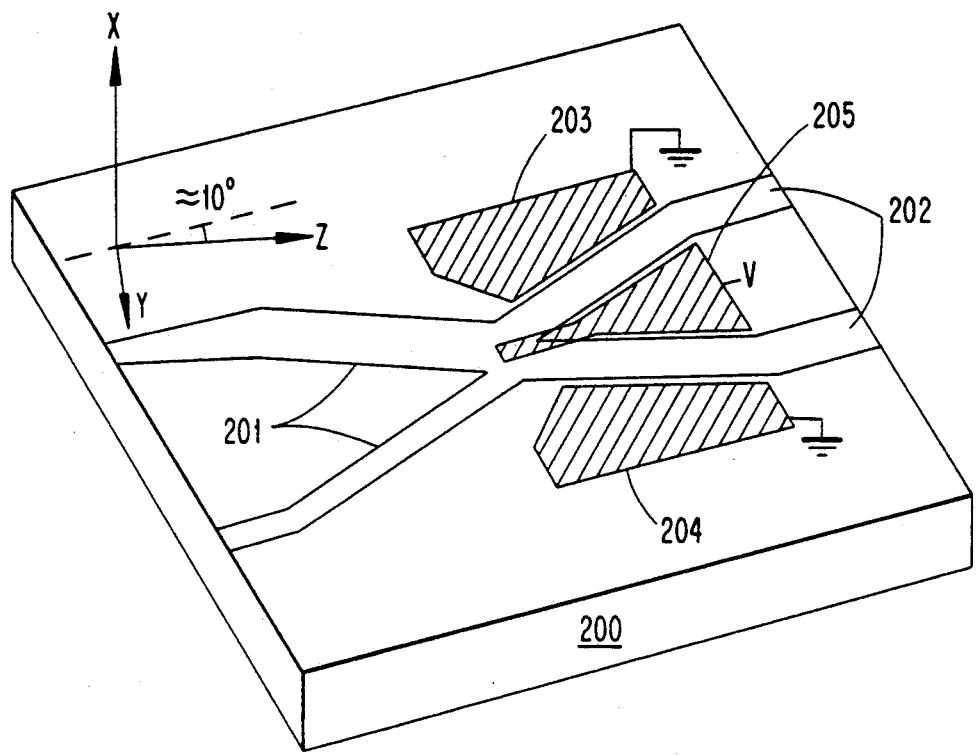
FIG. 9 represents a third embodiment of the invention using a X-cut, near Z-propagating 2×2 digital optical switch.

FIG. 9 shows a third embodiment of the invention involving a X-cut, near Z-propagating 2×2 digital optical switch 200. The digital optical switch 200 includes a monocrystalline LiNbO3 wafer upon which ribbon guides of titanium are formed as an asymmetrical Y-branch waveguide 201 at one side and a symmetrical Y-branch waveguide 202 at the other. The latter branch 202 can be made asymmetric by applying an electrical field via the electrodes 203, 204 and 205.

The respective branches 201 and 202 connect to form an X shape wherein the branches are approximately symmetric about an axis forming an acute angle with the Z axis of the wafer. The acute angle has a range of 0-20 degrees, and preferably 10 degrees, as in the other embodiments.

An asymmetric Y-branch 201 performs mode sorting, given that the transformation is adiabatic. Thus, the channel mode in the input waveguide with highest effective index gradually transforms along the branch to the first order local normal mode (fundamental mode) of the two mode region where the channels are near and influence each other (there is no power transfer between the local normal modes; at large separation the first order mode has the shape of the channel mode). In the same way, the mode in the other channel transforms to the second order mode. Thus, the signal in the wide channel transforms to the first order mode in the middle region and the signal in the narrower channel transforms to the second order mode of the middle region. If the other half 202 of the switch 200 is also asymmetric (i.e., an odd index perturbation is induced) by applying a voltage to the electrode 205 and grounding electrodes 203 and 204 (or visa versa), the first order mode in the middle region (corresponding to the wide input channel) transforms to the output channel with highest index and conversely the second order mode transforms to the output channel with lowest index.

Since the output Y-branch asymmetry can be electro-optically altered the device works as a 2×2 switch provided that the index perturbation is large enough and the transformation is adiabatic. If zero voltage is applied to the electrodes, a 3 dB splitting will occur for both signals.

Figure 10:
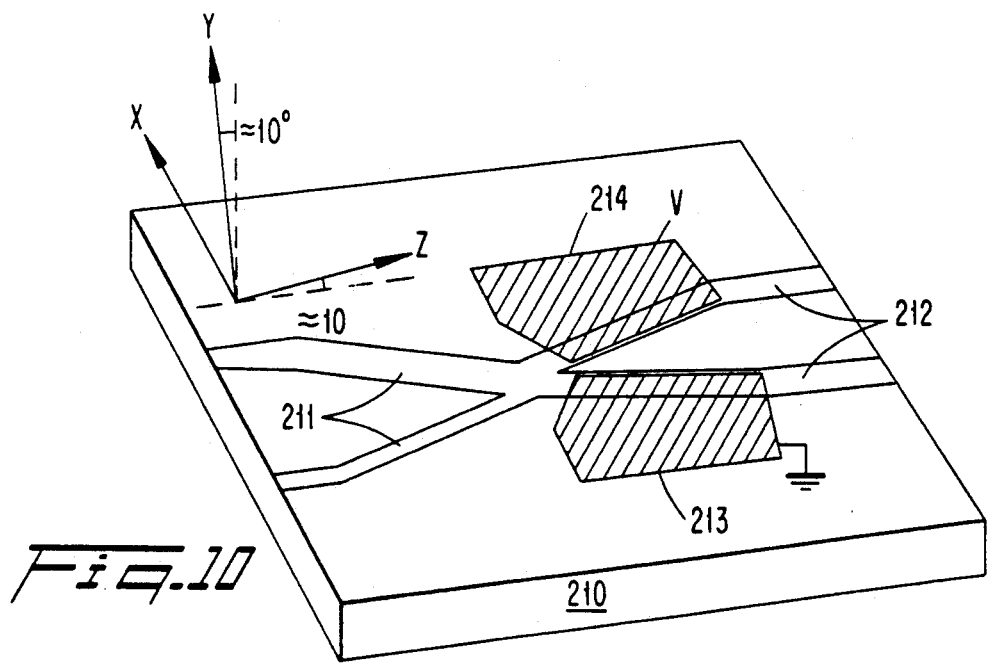
FIG. 10 represents a fourth embodiment of the invention using a near y-cut, near Z-propagating 2×2 digital optical switch.

FIG. 10 shows a fourth embodiment of the invention, which is a near Y-cut, near Z-propagating mode sorting switch 210. The mode sorting switch 210 acts as a 2×2 digital optical switch and includes a LiNbO3 wafer in which ribbon light guides of diffused titanium are formed as an asymmetrical Y-branch waveguide 211 at one side and a symmetrical Y-branch waveguide 212 at the other. The latter branch 212 can be made asymmetric by applying an electrical field via the electrodes 213 and 214.

Like the third embodiment, the respective branches 211 and 212 connect to form an X shape wherein the branches are approximately symmetric about an axis forming an acute angle with the Z axis of the wafer. The acute angle has a range of 0-20 degrees, and preferably 10 degrees, as in the other embodiments. Similarly, the normal of the wafer 190 has an orientation of 0-20 degrees and preferably approximately 10 degrees to the Y-axis of the material.

As with the third embodiment, an asymmetric Y-branch performs mode sorting, given that the transformation is adiabatic, in that the channel mode in the input waveguide with highest effective index gradually transforms along the branch to the first order local normal mode (fundamental mode) of the two mode region where the channels are near and influence each other (there is no power transfer between the local normal modes, at large separation the first order mode (i.e., first higher order mode) has the shape of the channel mode). In the same way, the mode in the other channel transforms to the second order mode. Thus, the signal in the wide channel transforms to the first order mode in the middle region and the signal in the narrower channel transforms to the second order mode of the middle region. If the other half 212 of the switch 210 is also asymmetric (i.e., an odd index perturbation is induced) by applying a voltage to the electrodes 213 and 214, the first order mode in the middle region transforms to the output channel with highest index and conversely the second order mode transforms to the output channel with lowest index.

Since the output Y-branch asymmetry can be electro-optically altered the device works as a 2×2 switch provided that the index perturbation is large enough and the transformation is adiabatic. If zero voltage is applied to the electrodes, a 3 dB splitting will occur for both signals.

The term "digital" in conjunction with these switches has to do with the transfer function (power coupled to the switch outputs as a function of applied voltage). For interferometric switches, such as directional couplers, transfer functions with oscillations in the voltage response are obtained. In the case of the digital optical switch, a mode sorting behavior is displayed which is based on modal evolution which means that this oscillation is not obtained (when the index difference in a specific case is large enough total switching will occur and no change will take place even if the index difference is raised further). Therefore, the transfer functions will be "digital".

While the present invention has been disclosed and described with reference to specific embodiments, it will be appreciated that variations and modification may be made herein without departing from the scope of the invention. Therefore, it is intended that the following claims cover each such variation and modification as falls within the true spirit and scope of the invention.

What is claimed is:

1. An optical switch, comprising:
    an X-cut, mono-crystalline wafer of electro-optic material;
    a first waveguide at an upper surface of said wafer, an axis of said first waveguide being near parallel to the Z-axis of said wafer;
    a second and third waveguide at said upper surface of said wafer, wherein said first waveguide and said second and third waveguides intersect with an orientation of a leg and arms, respectively, of a Y-shape;
    a first electrode adjacent to, and substantially bounded by, said second and third waveguides; and
    second and third electrode adjacent to said second and third waveguides, and each being opposite to said first electrode relative to one of said second and third waveguides, wherein predetermined voltages applied to said first, second and third electrodes produce mode sorting in said waveguides such that said optical switch acts as a digital optical switch.

2. An optical switch according to claim 1, wherein the electro-optical material comprises a polarization dependant material.

3. An optical switch according to claim 2, wherein said first, second, and third waveguides include LiNbO$_3$.

4. An optical switch according to claim 1, wherein said second and third electrodes are electrically grounded.

5. An optical switch according to claim 1, wherein a first voltage is applied to said first electrode.

6. An optical switch according to claim 1, wherein voltage is applied to said second and third electrodes.

7. An optical switch according to claim 1, wherein said first electrode is electrically grounded.

8. An optical switch according to claim 1, wherein said axis of said first waveguide is at an acute angle relative to said Z-axis of said wafer.

9. An optical switch according to claim 8, wherein said acute angle has a value of in the range of 0-20 degrees.

10. An optical switch according to claim 8, wherein said acute angle is approximately 10°.

11. An optical switch according to claim 1, wherein said mode sorting includes adiabatic mode-sorting in said Y shaped waveguides.

12. An optical switch, comprising:
    a near Y-cut, mono-crystalline wafer of electro-optic material;
    a first waveguide at an upper surface of said wafer, an axis of said first waveguide being near parallel to the Z-axis of said wafer;
    a second and third waveguide at said upper surface of said wafer, wherein said first waveguide and said second and third output waveguides intersect with the orientation of a leg and arms, respectively, of a Y-shape;
    a first electrode adjacent to, and substantially coinciding with, said second waveguide; and
    a second electrode adjacent to, and substantially coinciding with, said third waveguide, wherein predetermined voltage applied to said first and second electrodes produce mode sorting such that said optical switch acts as a digital optical switch.

13. An optical switch according to claim 12, wherein the electro-optic material comprises a polarization dependant material.

14. An optical switch according to claim 13, wherein said electro-optic material includes LiNbO$_3$.

15. An optical switch according to claim 12, wherein said second electrode is electrically grounded.

16. An optical switch according to claim 12, wherein a voltage source supplies a voltage to said first electrode.

17. An optical switch according to claim 12, wherein voltage is applied to said second electrode.

18. An optical switch according to claim 12, wherein said first electrode is electrically grounded.

19. An optical switch according to claim 12, wherein said axis of said first waveguide is at an acute angle relative to said Z-axis of said wafer.

20. An optical switch according to claim 19, wherein said acute angle has a value in the range of 0-20 degrees.

21. An optical switch according to claim 19, wherein said acute angle is approximately 10 degrees.

22. An optical switch according to claim 12, wherein an Y axis of said wafer is at a second acute angle relative to said upper surface of said wafer to form said near Y-cut.

23. An optical switch according to claim 22, wherein said second acute angle has a value in the range of 0-20 degrees.

24. An optical switch according to claim 22, wherein said second acute angle is approximately 10 degrees.

25. An optical switch according to claim 12, wherein the X-axis of said wafer lies within a plane of said upper surface of said wafer.

26. An optical switch according to claim 12, wherein said mode sorting includes adibatic mode-sorting in said Y shaped waveguides.

27. An 2×2 optical switch, comprising:
an X-cut, mono-crystalline wafer of electro-optic material;
first, second, third, and fourth waveguides at an upper surface of said wafer respectively intersecting with an orientation of arms of an X-shape and having an axis of approximate symmetry between said first and second, and said third and fourth waveguides being near parallel to the Z-axis of said wafer;
a first electrode adjacent to, and substantially bounded by, said third and fourth waveguides; and
second and third electrodes adjacent to said third and fourth waveguides, and each being opposite to said first electrode relative to one of said third and fourth waveguides, wherein predetermined voltages applied to said first, second and third electrodes produces mode sorting such that said optical switch acts as a digital optical switch.

28. An optical switch according to claim 27, wherein the electro-optic material comprises a polarization dependant material.

29. An optical switch according to claim 27, wherein said first, second, third and fourth waveguides include LiNbO$_3$.

30. An optical switch according to claim 27, wherein said second and third electrodes are electrically grounded.

31. An optical switch according to claim 27, wherein a first voltage is applied to said first electrode.

32. An optical switch according to claim 27, wherein voltage is applied to said second and third electrodes.

33. An optical switch according to claim 27, wherein said first electrode is electrically grounded.

34. An optical switch according to claim 27, wherein said axis of approximate symmetry is at an acute angle relative to said Z-axis of said wafer.

35. An optical switch according to claim 34, wherein said acute angle has a value of in the range of 0-20 degrees.

36. An optical switch according to claim 35, wherein said acute angle is approximately 10°.

37. An optical switch according to claim 27, wherein said mode sorting includes adiabatic mode sorting in said X-shaped waveguides.

38. A 2×2 optical switch, comprising:
a near Y-cut, mono-crystalline wafer of electro-optic material;
first, second third, and fourth waveguides at an upper surface of said wafer respectively intersecting with an orientation of arms of an X-shape and having an axis of approximate symmetry between said first and second, and said third and fourth waveguides being near parallel to the Z-axis of said wafer;
a first electrode adjacent to, and substantially coinciding with, said third waveguide; and
a second electrode adjacent to, and substantially coinciding with, said fourth waveguide, wherein predetermined voltages applied to said first and second electrodes produce mode sorting such that said optical switch acts as a digital optical switch.

39. An optical switch according to claim 38, wherein the electro-optic material comprises a polarization dependant material.

40. An optical switch according to claim 39, wherein said electro-optic material includes LiNbO$_3$.

41. An optical switch according to claim 38, wherein said second electrode is electrically grounded.

42. An optical switch according to claim 38, wherein a voltage source supplies a voltage to said first electrode.

43. An optical switch according to claim 38, wherein a voltage source supplies a voltage to said second electrode.

44. An optical switch according to claim 38, wherein said first electrode is electrically grounded.

45. An optical switch according to claim 38, wherein said axis of said first waveguide is at an acute angle relative to said Z-axis of said wafer.

46. An optical switch according to claim 45, wherein said acute angle has a value in the range of 0-20 degrees.

47. An optical switch according to claim 46, wherein said acute angle is approximately 10 degrees.

48. An optical switch according to claim 38, wherein an Y axis of said wafer is at a second acute angle relative to said upper surface of said wafer to form said near Y-cut.

49. An optical switch according to claim 48, wherein said second acute angle has a value in the range of 0-20 degrees.

50. An optical switch according to claim 26, wherein said second acute angle is approximately 10 degrees.

51. An optical switch according to claim 38, wherein the X-axis of said wafer lies within a plane of said upper surface of said wafer.

52. An optical switch according to claim 38, wherein said mode sorting includes adiabatic mode sorting in said X-shaped waveguides.

* * * * *